May 30, 1961 W. J. ZIMMERMAN 2,986,315
RACK AND STATION WAGON COMBINATION
Filed June 26, 1959

INVENTOR.
WILLIAM J. ZIMMERMAN
BY
Charles L. Lorchek
ATTORNEY

United States Patent Office 2,986,315
Patented May 30, 1961

2,986,315

RACK AND STATION WAGON COMBINATION

William J. Zimmerman, 1206 37th St. Court, Moline, Ill.

Filed June 26, 1959, Ser. No. 823,097

3 Claims. (Cl. 224—42.32)

This invention relates to racks and, more particularly, to racks for use in station wagons to prevent articles from moving about therein.

The present invention pertains to a particular device for the purpose of restraining loose objects in the interior rear of all models and makes of automobile station wagons. This device finds utility in its application in ease of placing, supporting, and confining packages, materials, and objects within the limits of the device.

It is, accordingly, an object of the present invention to provide a rack which is simple in construction, economical to manufacture, and simple and efficient to use.

Another object of the invention is to provide an improved rack.

Still another object of the invention is to provide a rack and vehicle in combination therewith.

A further object of the invention is to provide an improved folding rack.

Still a further object of the invention is to provide a rack which is readily collapsible and efficient when in use.

With the above and other objects in view, the present invention consists of the combination and arrangement hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

The device is useful as a rack in station wagons and vehicles of a similar type.

In the accompanying drawing, a luggage restrainer 10 is illustrated and hereinafter referred to as a rack 10. The rack 10 is made up of frames 13, 15, and 23 with legs 17 attached thereto. Legs 17 and 17' are twisted at right angles at 28 and 28' so that the front part of the flat metallic members thereof is in a vertical plane and the rear part is disposed in a horizontal plane.

Figure 3:
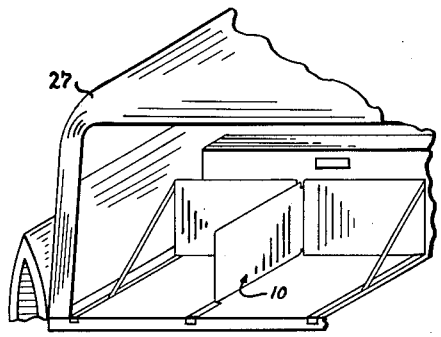
Fig. 3 is a partial rear view of a station wagon with the rack in place therein.
Figure 2:
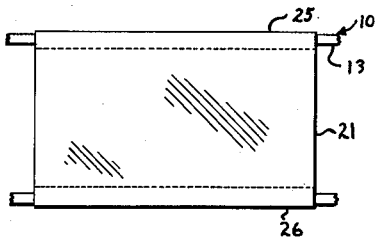
Fig. 2 is a partial view of the rack with a covering attached thereon.
Figure 1:
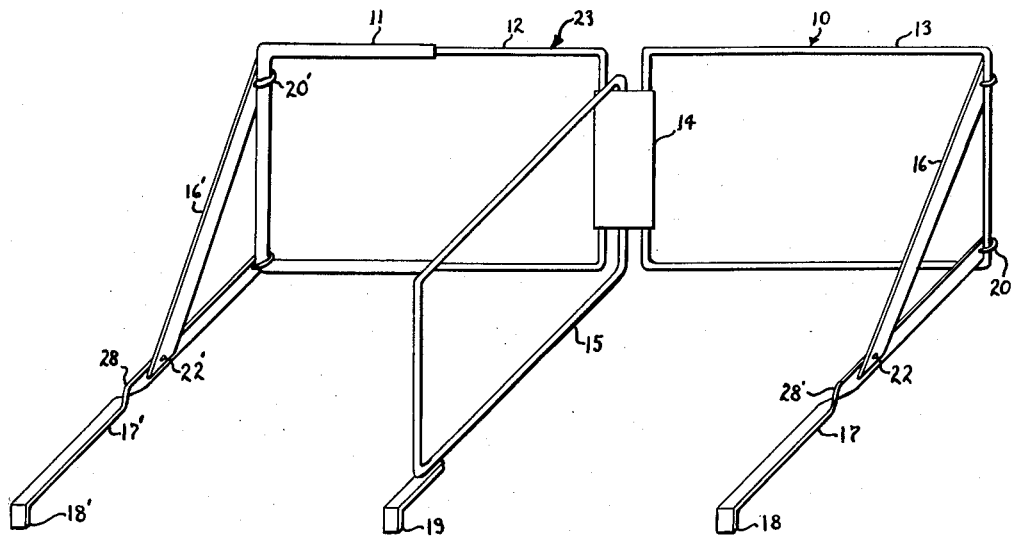
Fig. 1 is an isometric view of a rack according to the invention.

The rack 10 has the rigid frame member 13 which is in the form of a closed rectangle made of metal rod or tubing. The inner side of the frame 13 extends through a tubular hinge 14 and swings thereon. The leg 17 is attached to the outside end of the frame 13 by means of rings or U-bolts 20. The bolts 20 extend through holes in the leg 17 or they may be welded thereto as shown in Fig. 1.

An angle hook 18 is integral to the leg 17 and bends downwardly at a right angle to the leg 17. A brace 16 is pivoted to the leg 17 at 22 and is swingably attached to the frame 13 by means of the rings or U-bolts 20.

The divider frame 15 is made in the form of a rod bent in closed rectangular form. One side of the frame 15 passes through the center of the hinge 14 and is swingable thereon. The lower distal end of the divider frame 15 has an angle hook 19 affixed thereto as shown in Fig. 1. The hook 19 is formed by bending the distal end thereof downwardly.

The adjustable frame 23 is made up of two U-shaped frame members 11 and 12. The legs of the frame member 11 are tubular and the frame member 12 telescopes into the hollow legs of the frame member 11 and is adjustable to the width of the vehicle in which it is to be used. The frame 23 has the leg 17', a brace 16', and an angle hook 18' the same as the frame 13. The leg 17' and the brace 16' are swingably connected to the frame 11 by means of rings or U-bolts 20' in the same manner that the leg 17 and the brace 16 are connected to the frame 13. The frames 13, 23, and 15 are swingable to T-shaped relation with each other. The upper and lower sides of the frames 13 and 23 and the divider frame 15 are received in hems 25 and 26 of fabric material 21. The fabric material 21 could be fixed to the frames in a number of different ways known to the art. The fabric material may be plastic, plastic covered canvas, or any other well known material.

The frames 13 and 23 and the divider frame 15 form panels. The rack 10 is shown installed in the rear section of a station wagon 27 with its legs 17 and 17' resting on the floor of the station wagon and the rack 10 extending rearwardly to the rear door of the station wagon 27. The angle hooks 18, 18', and 19 hook over the rear edge of the floor and restrain the rack 10 from moving forward. At the user's preference, the divider frame 15 may be swung in the direction of the frame 23 or the frame 13 so that the divider frame 15 is adjacent to the frame 23 or the frame 13, thus allowing full rear width of the station wagon for restraint of baggage. The rear transom door may be closed to lock the rack 10 in position.

The width of the rack 10 may be adjusted to suit the width of the bed of the station wagon by sliding the frame member 11 inwardly or outwardly on the frame member 12.

When the rack 10 is not in use, it may be folded up by folding the frames 13 and 23 into parallel relation with the divider frame 15 and then folding the legs 17 and 17' into parallel relation with the frames 13 and 23, thereby forming a flat package easily transported and stored.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a station wagon and a rack, said station wagon having a platform at the rear end thereof terminating in a door, said rack comprising two spaced frame members swingably connected together and adapted to be disposed in a generally vertical plane, and leg members each having a downwardly extending hook on one end thereof and attached to said frame members at the other end thereof adapted to extend rearwardly over said platform, brace members attached to said frame members and extending downwardly and rearwardly and attached to said leg members, said hooks extending downwardly over said rear end of said platform and adapted to have the door of said station wagon close over said hooks to hold said rack in position.

2. The combination recited in claim 1 wherein a divider member is swingably attached to the ends of said frame members connected together, the end of said divider member remote from said frame members having a downwardly extending hook thereon adapted to overlie the edge of said platform.

3. The combination recited in claim 2 wherein said frame members have a flexible sheet material stretched thereover.

References Cited in the file of this patent

UNITED STATES PATENTS

| | | |
|---|---|---|
| 568,910 | Knowles | Oct. 6, 1896 |
| 795,646 | Plummer | July 25, 1905 |
| 1,357,005 | Rust | Oct. 26, 1920 |
| 1,778,771 | Pritchard | Oct. 21, 1930 |
| 2,094,401 | Girl | Sept. 28, 1937 |
| 2,369,552 | Ferran | Feb. 13, 1945 |
| 2,554,776 | Comeau | May 29, 1951 |
| 2,578,238 | Goldman | Dec. 11, 1951 |
| 2,594,319 | Law | Apr. 29, 1952 |
| 2,874,885 | Young | Feb. 24, 1959 |
| 2,889,097 | Broehl | June 2, 1959 |